United States Patent
Eddy et al.

(10) Patent No.: US 12,482,164 B2
(45) Date of Patent: Nov. 25, 2025

(54) METHOD FOR PROTECTING ANONYMITY FROM MEDIA-BASED INTERACTIONS

(71) Applicant: GoBeyond, New York, NY (US)

(72) Inventors: Camille Eddy, Boise, ID (US);
Jennifer Halweil, New York, NY (US);
Mohammad Mahee, Brooklyn, NY (US)

(73) Assignee: GoBeyond, New York, NY (US)

( * ) Notice: Subject to any disclaimer, the term of this patent is extended or adjusted under 35 U.S.C. 154(b) by 270 days.

(21) Appl. No.: 18/308,432

(22) Filed: Apr. 27, 2023

(65) Prior Publication Data

US 2023/0351664 A1 Nov. 2, 2023

Related U.S. Application Data

(60) Provisional application No. 63/363,652, filed on Apr. 27, 2022.

(51) Int. Cl.
| | |
|---|---|
| *G06T 13/40* | (2011.01) |
| *G10L 15/05* | (2013.01) |
| *G10L 21/003* | (2013.01) |
| *G10L 21/013* | (2013.01) |
| *G10L 21/043* | (2013.01) |

(52) U.S. Cl.
CPC ............. *G06T 13/40* (2013.01); *G10L 15/05* (2013.01); *G10L 21/003* (2013.01); *G10L 21/043* (2013.01); *G10L 2021/0135* (2013.01)

(58) Field of Classification Search
CPC ....... G06T 13/40; G10L 15/05; G10L 21/003; G10L 21/043; G10L 2021/0135; G10L 13/033; G06F 21/6254
USPC .......................................................... 345/473
See application file for complete search history.

(56) References Cited

U.S. PATENT DOCUMENTS

| | | | |
|---|---|---|---|
| 10,467,339 B1 * | 11/2019 | Shen ..................... | G06F 40/247 |
| 2020/0143329 A1 * | 5/2020 | Gamaliel ......... | H04N 21/45455 |
| 2020/0373002 A1 * | 11/2020 | Kadambi ............... | G16H 30/40 |

(Continued)

OTHER PUBLICATIONS

International Search Report and Written Opinion directed to related International PCT Application No. PCT/US24/26407, mailed Aug. 7, 2024, 24 pages.

*Primary Examiner* — Sheree N Brown
(74) *Attorney, Agent, or Firm* — Sterne, Kessler, Goldstein & Fox P.L.L.C.

(57) ABSTRACT

Disclosed herein are a computing device, method, and computer-readable medium embodiments for altering video and/or audio data during a media-based interaction to protect anonymity of one or more users in the media-based interaction for the purpose of removing bias from the media-based interaction. In some aspects, video and audio data including facial information and speech data of a user may be streamed during the media-based interaction between client devices. The video and audio data may be altered in real-time during the media-based interaction to change the visual and/or audio aspects of one or more users during the media-based interaction. This alterations to the video and audio data may be based on identifying visual and audio features from a list of one or more visual and audio identifiers associated with age, sex, and/or gender. The alteration results in a new virtual representation presented during the interaction that anonymizes the user.

20 Claims, 4 Drawing Sheets

(56) References Cited

U.S. PATENT DOCUMENTS

| | | | |
|---|---|---|---|
| 2020/0388139 A1* | 12/2020 | Saha | H04N 7/188 |
| 2021/0035047 A1* | 2/2021 | Mossoba | G06T 13/40 |
| 2021/0082404 A1* | 3/2021 | Sanders | G10L 15/22 |
| 2021/0240892 A1* | 8/2021 | Meinders | G06F 30/27 |
| 2022/0245594 A1* | 8/2022 | Baid | G06F 21/6245 |
| 2023/0351664 A1 | 11/2023 | Eddy et al. | |
| 2024/0126995 A1 | 4/2024 | Ahmed et al. | |

\* cited by examiner

METHOD FOR PROTECTING ANONYMITY FROM MEDIA-BASED INTERACTIONS

CROSS-REFERENCE TO RELATED APPLICATIONS

This application claims priority to U.S. Provisional Patent Application No. 63/363,652, filed Apr. 27, 2022, titled "A Method for Using an Automated Assistant to Protect Anonymity or Remove Bias," the contents of which are hereby incorporated herein by reference in its entirety.

BACKGROUND

Technical Field

Aspects of the present disclosure relate to components, systems, and methods for protecting anonymity of users in media-based interactions.

Background

There are often disparities in the outcomes of interactions between people of different races, gender, sexual identities, and/or cultures. The proliferation of remote conferencing tools which enable people to virtually interact with others has amplified these disparate outcomes. Indeed, the COVID-19 pandemic has increased the prevalence of remote conferencing tools in business and social contexts. These business and social interactions may typical involve parties where one party is empowered with evaluating the other party, such as interviews and business pitches. These types of interactions likely will take place virtually using remote conferencing tools. As with in-person interactions, these virtual interactions can also be affected by bias. There is a need and opportunity in the field to reduce the effect of cognitive biases that may take place in such virtual media interactions.

SUMMARY

In aspects presented herein, methods, computing devices, and computer-readable medium can provide methods for protecting anonymity and removing bias from media-based interactions.

In aspects, an example method, an example computing device, and a non-transitory computer-readable medium for protecting anonymity to remove bias from media-based interactions are described. In some embodiments, the method may include accessing video data that comprises facial information of a user. The method may further include accessing audio data that includes speech data associated with the video data and accessing a list of identifiers. In some embodiments, each identifier may be associated with one or more bias categories. In one embodiment, the one or more bias categories may include age, race, and gender. Each identifier may further be associated with a mapping where each identifier can be mapped to a set of one or more neutral or anonymizing synonyms that are neutral with respect to one or more of the one or more bias categories. In some embodiments, the method may also apply a natural language filter to the audio data to alter user speech. The natural language filter can be configured to identify a set of one or more words in the audio data, match any of the identified one or more words in a list of identifiers, and replace each matched one or more words with one or more synonyms from the corresponding identifier mapping, where the synonyms anonymizes the user's speech. In some embodiments, the method may also alter video data such as by altering or replacing the facial information of the user. For example, the video data may be altered to include a neutral facial representation of the user where the neutral facial representation anonymizes visual aspects of the user. In some embodiments, the method may alter the video data and audio data by generating a virtual representation of the user. The virtual representation of the user can include a visual component including the neutral visual representation of the user. The virtual representation can also include an audio component that includes the altered speech of the user. In some embodiments, the virtual representation may be implemented as an automated assistant representing the user during the media-based interaction. The method can then transmit or stream the virtual representation to one or more computing devices over an electronic network during a media-based interaction between the computing devices.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

BRIEF DESCRIPTION OF THE DRAWINGS

The accompanying drawings, which are incorporated herein and form a part of the specification, illustrate aspects of the present disclosure and, together with the description, further serve to explain the principles of the disclosure and to enable a person skilled in the pertinent art to make and use the disclosure.

In the drawings, like reference numbers generally indicate identical or similar elements. Additionally, generally, the left-most digit(s) of a reference number identifies the drawing in which the reference number first appears.

Aspects of the present disclosure will be described with reference to the accompanying drawings.

DETAILED DESCRIPTION

Currently, there is a need for technology to anonymize user interactions during remote media-based interactions that involve multiple media devices (e.g., job interviews, business pitches). In some embodiments, one or more users may request to be anonymized during the interaction in order to remove any potential bias that may occur during the interaction from other users. This bias may occur from the users judging the one or more users based off physical characteristics, such as their age, race, and/or gender. Bias may also occur based off the audio characteristics of the one or more users, such as their word choices and use of slang terms.

Figure 1:
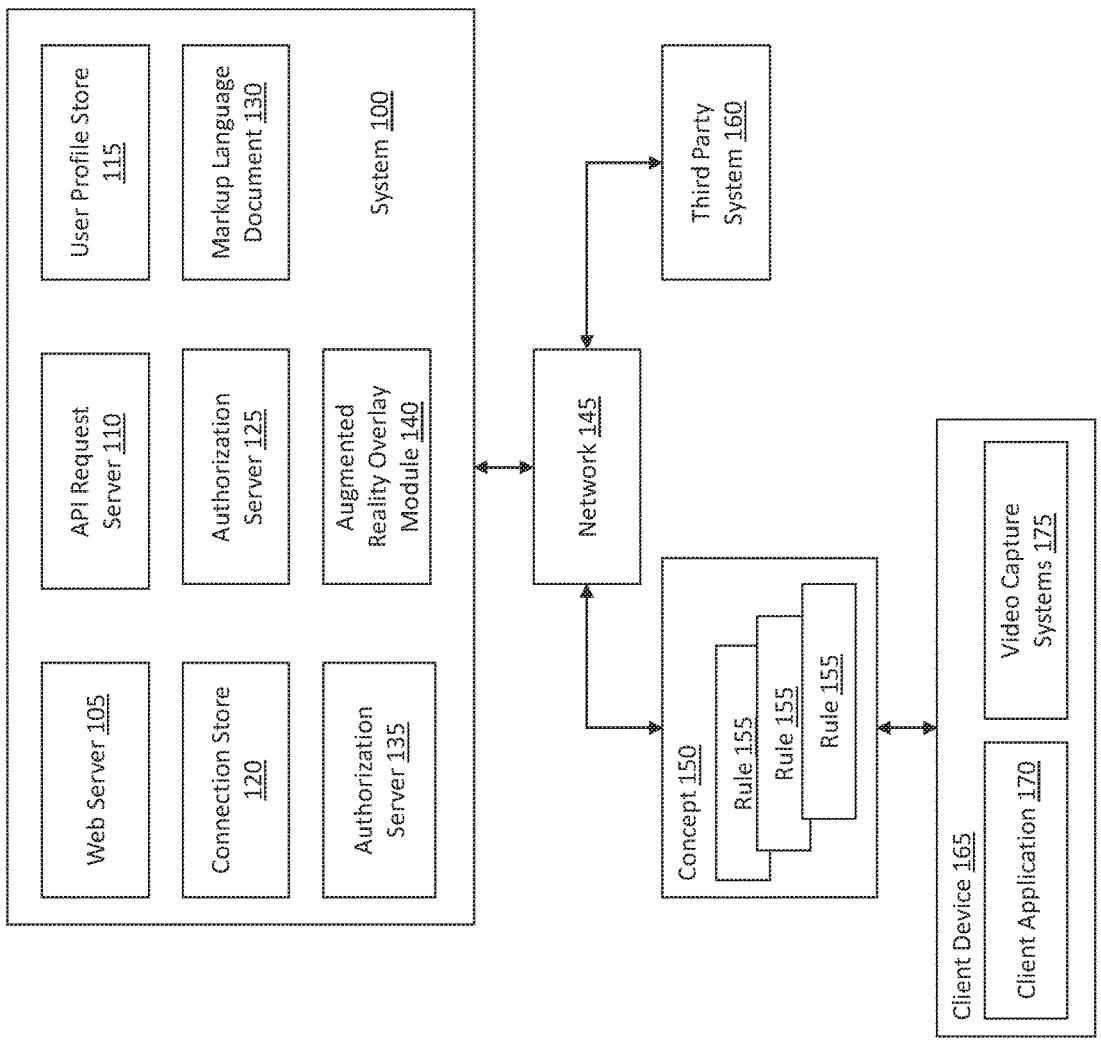
FIG. 1 is an illustration of a system for protecting anonymity and removing bias from media-based interactions, according to some aspects of the present disclosure.

FIG. 1 illustrates a block diagram of an example system 100 according to embodiments of the present disclosure.

Aspects herein provide a technological solution to this problem via systems and methods that alter, in real-time, video and audio data of media-based interactions to anonymize one or more users. In some embodiments, altering the video and audio data may include altering or replacing facial features from the video data, audio features from the audio data, or both. Altering the video and audio data results in changing any identifying characteristics of the user during the media-based interaction. The alterations may be based on identification of visual or audio features that have been selected as potentially identifying a bias category associated with the user (i.e., race, gender, and/or ethnicity). These features may be included in one or more lists that map to anonymizing or neutral replacements for the visual and audio features.

In one embodiment, a client device 165 may be participating in a media-based interaction with a third party system 160. During the interaction, a user associated with client device 165 may submit a request to system 100 to anonymize the user during the media-based interaction. The request may include preferences or options for modifying characteristics associated with physical appearance (i.e. age, race, and/or gender) and/or audio characteristics of the user. Based on the request, system 100 may anonymize the visual and/or audio characteristics associated with the user of client device 165. For example, augmented reality overlay module (AROM) 140 of system 100 may modify the video and audio data received from client device 165. AROM 140 may change the video feed by altering or replacing one or more aspects of the user's physical appearance during the interaction. AROM 140 may identify the one or more visual aspects from a predefined list of visual characteristics. For example, the predefined list of visual characteristics may include visual features associated with various bias categories of the user of client device 165. In one embodiment, AROM 140 may access bias categories associated with age, race, and/or gender. The audio output from client device 165 may include speech data from the user of client device 165. AROM 140 may also change the audio output from client device 165. AROM 140 may alter the audio output by changing or replacing one or more aspects of the user's speech during the interaction such that the one or more parties participating in the media-based interaction cannot discern characteristics about the user of client device 165 from the audio output. AROM 140 may identify one or more aspects of the audio output to change based on a predefined list of audio identifiers. In some embodiments, AROM 140 may alter the audio output by determining each word in the audio output, checking if the word is in a predefined list of audio identifiers, and then replacing each of the detected words. The predefined list of audio identifiers may include words associated with bias categories of the user of client device 165. AROM 140 may remove or replace the identified words with anonymizing words from a predefined list of neutral words to obscure the user. In one embodiment, system 100 may stream the altered video and audio feeds in the form of a virtual representation, such as a digital avatar, of the user of client device 165. Third party system 160 may stream the virtual representation instead of the actual user of client device 165 to the other users participating in the media interaction.

System 100 may include a web server 105, an API request server 110, a user profile store 115, a connection store 120, an action logger 125, a markup language document 130, an authorization server 135, and AROM 140.

Web server 105 may facilitate an interaction between two or more devices, such as client device 165 and third party system 160, which in some embodiments, may be implemented as one or more client devices. In one embodiment, web server 105 may act as the interface between system 100 and the network 145. Web server 105 may be comprised of software and hardware that uses HTTP (Hypertext Transfer Protocol) and other protocols to respond to client requests made over network 145. Web server 105 may forward requests from network 145 to API request server 110.

Network 145 can be wired, wireless, or a combination thereof. Network 145 can include any combination of local area networks, wide area networks, the Internet, or other connections as would be appreciated by a person of ordinary skill in the art (POSA). Third party system 160 may be connected to network 145. Third party system 160 may be capable of communicating electronically over network 145. Third party system 160 may comprise a wired or wireless communication device, such as a cellphone, desktop computer, laptop computer, or any similar device with electronic communication capacity. In another embodiment, third party system 160 may comprise a television. The television may be connected to a cable distribution network. This may be advantageous in a scenario where client device 165 wishes to stream the generated virtual representation to a large number of third party systems 160. In another embodiment, third party system 160 may be a projector capable of emitting a projection. In one embodiment, the projection may be a two dimensional projection shown against a flat surface such as a screen or wall. In another embodiment, the projection may be three dimensional (i.e., a hologram). Using a three dimensional projection may be desirable because it will allow the users of third party system 160 to experience a more lifelike interaction with the virtual representation of the user of client device 165. Client device 165 may also be connected to network 145.

Client device 165 may be any device capable of communicating electronically over network 145. Client device 165 may comprise a wired or wireless communication device, such as a cellphone, desktop computer, laptop computer, or any similar device with electronic communication capacity. Client device 165 may also be a television or projector. Client device 165 may contain a video capture system 175.

In some embodiments, video capture system 175 may be a system which captures audio and video from client devices connected to system 100, such as client device 165. Video capture system 175 may include but is not limited to any combination of an integrated camera and microphone, a web camera and separate microphone, and a video camera. Client device 165 may also contain one or more client application 170. Client application 170 may be any application capable of using video capture system 175 to capture and stream audio and video data over network 145. For example, client application 170 may also be capable of transmitting the captured video and audio over network 145. In one embodiment, client application 170 may utilize the video capture system 175 to track the facial expressions of the user of client device 165 and provide the tracked facial expressions as part of the video data to system 100, which may utilize the tracked facial expressions to alter certain aspects of the user's visual appearance within the visual data. Client application 170 may connect to web server 105 via network 145. Web server 105 may record the connection at connection store 120. If client device 165 has accessed system 100 before, web server 105 may query user profile store 115 to determine if client device 165 user has an associated user profile.

Web server 105 may receive audio and visual data from client device 165 and may route the audio and visual data to AROM 140, which may be configured to alter the audio and visual data, such as by modifying the visual appearance in the video data and the speech content and voice frequency in the audio data, just to name a few examples. AROM 140 may be configured to perform natural language processing to analyze the speech content in the audio data. AROM 140 may utilize the natural language processing to detect words in the audio data that can be used to identify a bias category. AROM 140 may modify the audio data by filtering and replacing the detected words that are recognized by the natural language processing with anonymizing terms. This may enable system 100 to anonymize video and audio data between client device 165 and third party system 160. In some embodiments, system 100 may receive a request from one or more client devices 165 to begin anonymizing the video and/or audio data. For example, a user of client device 165 may submit a request to system 100 for a video conference where the user wishes to remain anonymous. In some embodiments, system 100 may automatically anonymize the video/audio data based on the type of conference call, such as for interviews, pitch presentations AROM 140 may use one or more rules 155 to detect the potentially identifying words and to replace the identifying words with anonymizing words. AROM 140 may also alter the video content in the video data received from client device 165 to create a representation of the user of client device 165 that is neutral with respect to one or more bias categories. In some embodiments, the video data may be streaming data. This may be accomplished by replacing the visual representation of the user in the video data with a computer-generated avatar. The avatar anonymizes the user and prevents the user from being visually identifiable by parties in the meeting.

Rules 155 may be stored as part of a concept 150. Concept 150 may be internal to system 100. In another embodiment, concept 150 may be a standalone component connected to network 145. Concept 150 may also be stored on the client device 165. Rules 155 within the concept 150 may be stored under domain libraries. Each domain library may contain rule(s) 155 pertaining to certain characteristics. For example, during a video conference between client device 165 and third party system 160, AROM 140 may detect words relating to a bias category (i.e., age, sex, and/or race). Based on this detection, AROM 140 may only access rule(s) 155 under a domain library corresponding to each of the identified bias categories. Since video conferencing can be resource intensive, minimizing the processing time of AROM 140 is desirable. By categorizing rule(s) 155 into different domain libraries, AROM 140 may be able to search through fewer rule(s) 155 than if all rule(s) 155 were stored together. Rule(s) 155 may also be assigned confidence scores. The confidence score for each rule 155 may be assessed and rule 155 with the highest score may be selected.

AROM 140 may also track and/or report any filtering that is applied. In one embodiment, segments of information collected across AROM 140, including filtered words, chosen domains, and confidence scores are reported in automated documents to ensure transparency of the algorithms and processes. AROM 140 may use the amount of words replaced to infer the amount of bias present in the interaction between client device 165 and third party system 160. AROM 140 may relay its decisions to action logger 125 for storage. AROM 140 may also relay its decision to client device 165. Client device 165 may provide a score for each decision made by AROM 140. In one embodiment, the score may be binary, signifying whether the decision was correct or incorrect. In another embodiment, the score may be continuous. For example, the decision may be scored on a scale from 0-10, where 0 corresponds to a completely wrong decision, and 10 corresponds to a completely correct decision. AROM 140 may benefit from a continuous score because it provides more data points to assess the likely result of a potential decision.

AROM 140 may use the collected scores in future operations to inform its decisions. For example, AROM 140 may make a mistake by misinterpreting a word and using a rule 155 from an incorrect bias category. Client device 165 may signal that a mistake was made by providing a low score to AROM 140. The next time AROM 140 detects the same word, it may use the previously received low score associated with the word to choose a different rule 155 from a different bias category. Scoring AROM 140's decisions may result in increased accuracy over time. AROM 140 may use the historical data and scores received in all future interactions involving system 100, regardless of the particular client device 165 involved in the decisions made or scores generated.

AROM 140 may also transmit a copy of the altered content to markup language document 130. In one embodiment, AROM 140 may send a copy of the altered video and a transcript of the edited speech for storage at markup language document 130.

Figure 2:
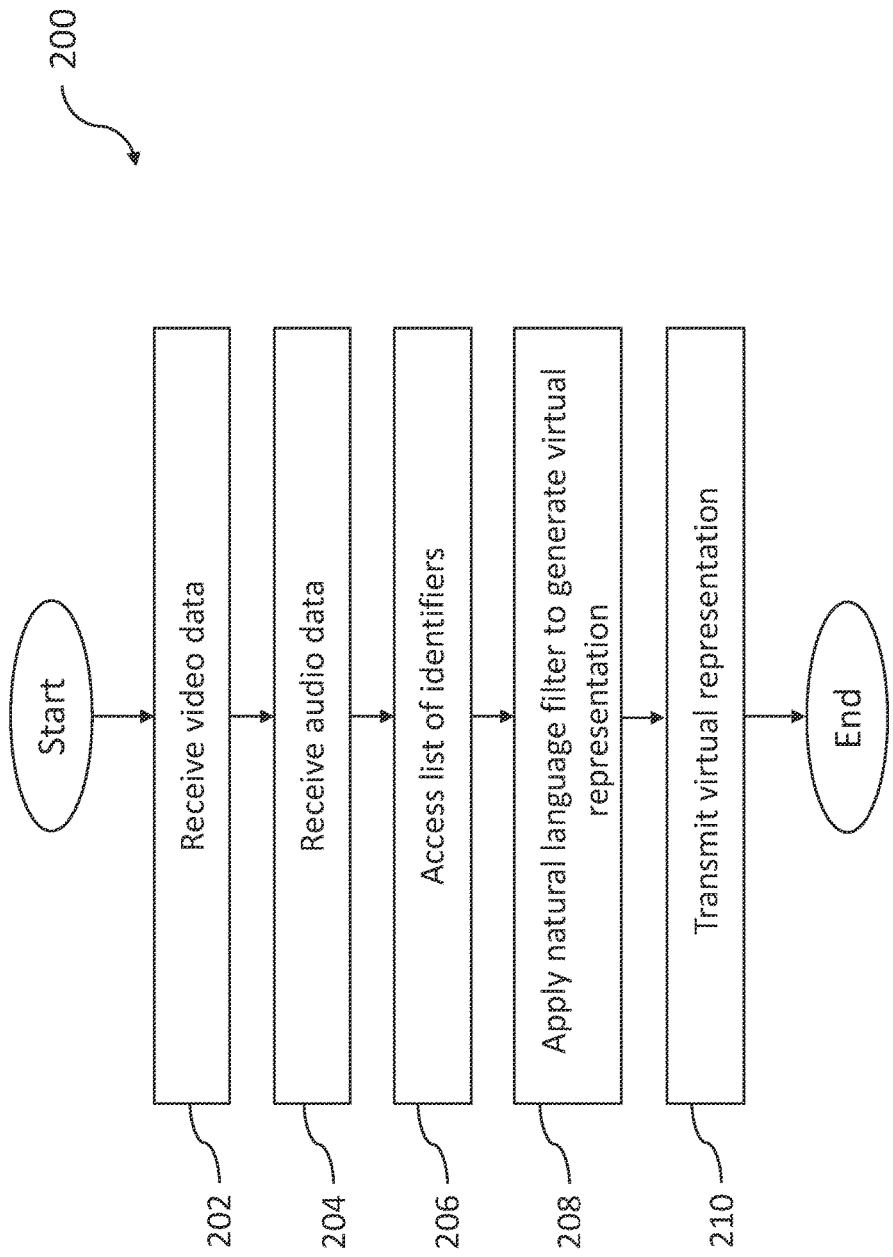
FIG. 2 is a flowchart illustrating steps to protect anonymity and remove bias from media-based interactions, according to some aspects of the present disclosure.

FIG. 2 is a flowchart 200 illustrating steps to protect anonymity and/or remove bias from media-based interactions, in accordance with an embodiment.

At step 202, web server 105 may receive video data from client device 165 and may transmit the received video data to AROM 140. The video data may be associated with the user of client device 165. In one embodiment, the video data may be a live feed from video capture system 175 on client device 165. In another embodiment, the video data may have been previously recorded and saved to a storage device. The storage device may be a hard disk drive and/or a removable storage device or drive. The removable storage drive can be a floppy disk drive, a magnetic tape drive, a compact disk drive, an optical storage device, tape backup device, and/or any other storage device/drive.

At step 204, web server 105 may receive audio data from client device 165 and transmit the audio data to AROM 140. The audio data may be associated with the user of client device 165. In one embodiment, the audio data may be a live audio feed from video capture system 175. In another embodiment, the audio data may have been previously recorded and saved to a storage device. The storage device may be a hard disk drive and/or a removable storage device or drive. The removable storage drive can be a floppy disk drive, a magnetic tape drive, a compact disk drive, an optical storage device, tape backup device, and/or any other storage device/drive. The audio data may contain the speech of a user interfacing with client device 165.

At step 206, AROM 140 may access a list of identifiers. For example, system 100 may receive, store, and update a predefined list of identifiers where each identifier has been determined likely to cause bias. Each identifier may be stored under one or more bias categories. In the predefined list, each identifier may be mapped to one or more synonyms that have a similar meaning to the identifier, but which have been determined as unlikely to produce a biased response. These synonyms may be called anonymizing or neutral words that obscure the bias category associated with the identifier. For example, certain words may be associated with a particular race, a particular gender, or a particular region of the country or world. The predefined list of identifiers may include mappings to replace those words with anonymizing counterparts. Each identifier may have one or more mapped anonymizing synonyms. AROM 140 may assign a probability or confidence score to each synonym based on the synonym's ability to effectively replace the identifier. A user of client device 165 or an administrator of system 100 may edit the list of identifiers and their associated mappings.

At step 208, AROM 140 may apply a natural language filter to generate a virtual representation. The natural language filter may be responsible for editing the video and audio data. The video data may be replaced or altered to remove any identifiable traits of the user of client device 165 belonging to one or more bias categories. The natural language filter may parse the audio data, determine if any words within the audio are part of the list of identifiers, and replace each detected identifier with one of its corresponding synonyms. A virtual representation may be created from the combination of the edited video and audio data. In one embodiment, the virtual representation may be in the form of a digital avatar.

At step 210, system 100 may send the virtual representation to third party system 160 over network 145. Third party system 160 may display the virtual representation. For example, if third party system 160 is a computer or a television, the virtual representation may be displayed on the screen. In another embodiment, if third party system 160 is a projector, the virtual representation may be projected into the space associated with third party system 160. The virtual representation may contain two components, one corresponding to the altered video feed and the other corresponding to the altered audio data. The user profile at user profile store 115 may contain a settings value for which components of the virtual representation are transmitted to third party system 160. In one embodiment, the default settings value may correspond to transmitting both the altered video feed and the altered audio data. In another embodiment, only the altered video feed or only the altered audio data may be transmitted. The user of client device 165 or an administrator of system 100 may alter the settings value within the user profile.

Figure 3:
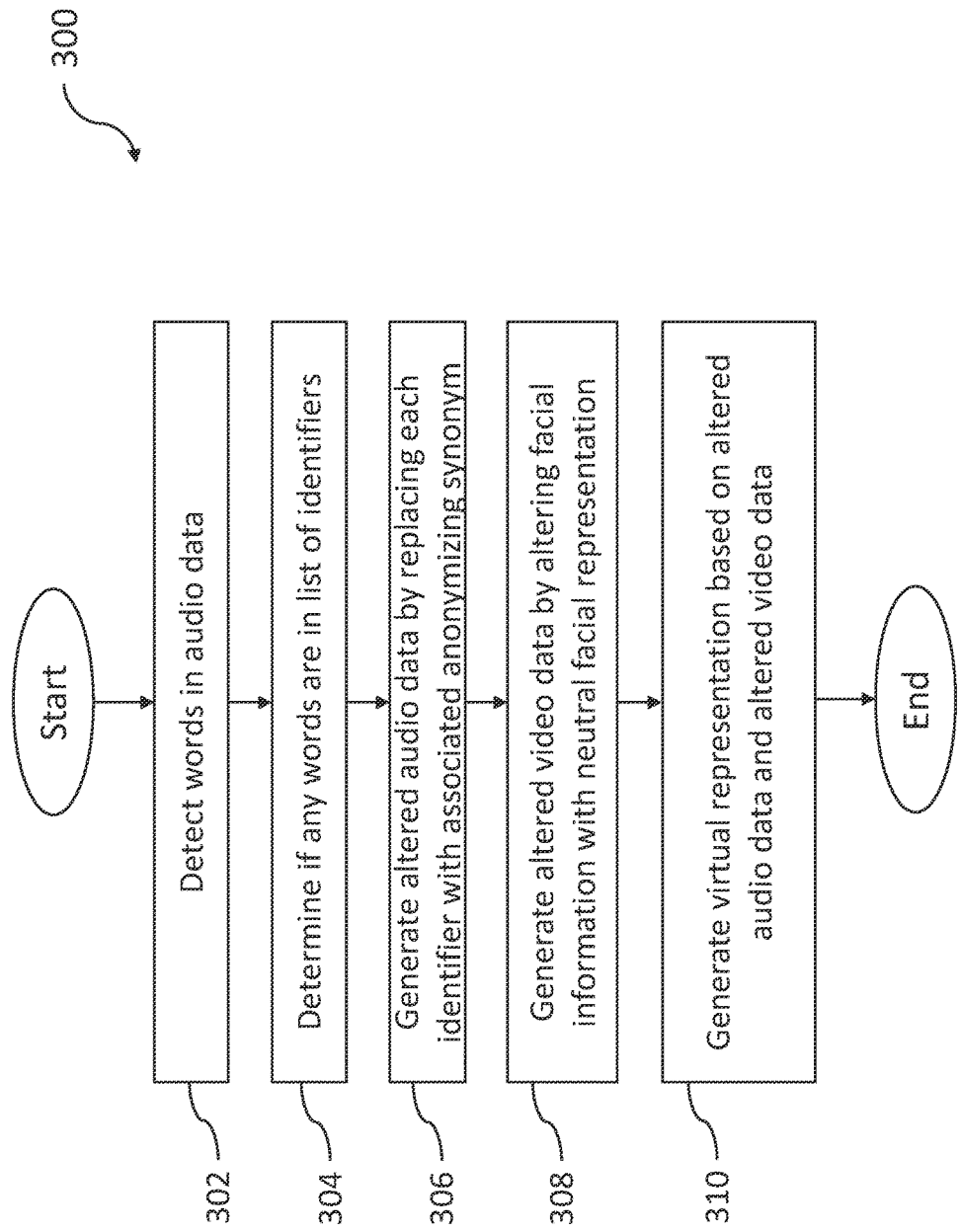
FIG. 3 is a flowchart illustrating steps by which a natural language filter is applied to protect anonymity and/or remove bias from media-biased interactions, according to some aspects of the present disclosure.

FIG. 3 is a flowchart 300 illustrating steps by which a natural language filter is applied to protect anonymity and/or remove bias from media-biased interactions, according to an embodiment. Flowchart 300 is an exemplary embodiment of step 208 in FIG. 2.

At step 302, AROM 140 may convert the audio data into a set of words. In one embodiment, AROM 140 may use a statistical model such as a Hidden Markov Model to convert the audio data into a set of words. In another embodiment, AROM 140 may use a recurrent neural network may be used to perform the conversion. AROM 140 may use multiple algorithms to perform the conversion in order to determine which method achieves the highest degree of accuracy. Client device 165 may be able to verify and edit the results of the audio data conversion. AROM 140 may use the verification and edits to improve the audio data conversion process. Client device 165 may specify the language of the audio before the conversion is performed. In another embodiment, AROM 140 may automatically detect the language of the audio data before the conversion is performed. The user profile at user profile store 115 may contain a default language setting. A user of client device 165 or an administrator of system 100 may update the default language setting. AROM 140 may also update the default language setting upon detection of a language. Once the audio data is converted into a set of words, AROM 140 may generate an empty set to construct the altered audio data.

At step 304, AROM 140 may examine each word to determine whether the word matches any of the identifiers in a list of identifiers. If there is a match, AROM 140 may flag the word for further processing. If the word does not match any of the identifiers, it may not be flagged. A user of client device 165 may specify that exact matches must be present for a word to be flagged. In another embodiment, both partial and complete matches may be flagged. A settings value corresponding to whether the user of client device 165 requires exact or partial matches may be part of the user profile at user profile store 115.

At step 306, AROM 140 may replace each flagged word with a synonym corresponding to the flagged word, to generate an altered audio. Each identifier may have one or more corresponding synonyms. AROM 140 may assign each synonym a probability or confidence score. AROM 140 may choose the synonym with the highest confidence score to replace the word. AROM 140 may copy the chosen synonym into the empty set that was generated in step 302. AROM 140 may also copy words that were not flagged into the empty set. AROM 140 may copy words into the empty set such that original order of words in the converted audio data is maintained. If an identifier has no corresponding synonyms, AROM 140 may copy the original word into the new set.

At step 308, AROM 140 may replace the facial information associated with the user of client device 165 with a neutral facial representation. The neutral facial representation may not have any features corresponding to a bias category in order to reduce any potential biases. In embodiments involving streaming video, AROM 140 may update the facial representation in real-time to mimic the facial movements of the user.

At step 310, AROM 140 may generate a virtual representation. The virtual representation may comprise the neutral facial representation generated in step 308. The virtual representation may also use the altered audio in step 306. The virtual representation may have a text-to-speech utility to output the words in the altered audio. The output of the altered audio may have vocal parameters that are different from the original audio data provided by client device 165. Client device 165 may alter one or more of the vocal parameters such as the frequency and pitch. The user profile at user profile store 115 may contain the updated parameter values for future use. In one embodiment, the virtual representation may be a digital avatar. In another embodiment, the virtual representation may be an automated assistant.

Figure 4:
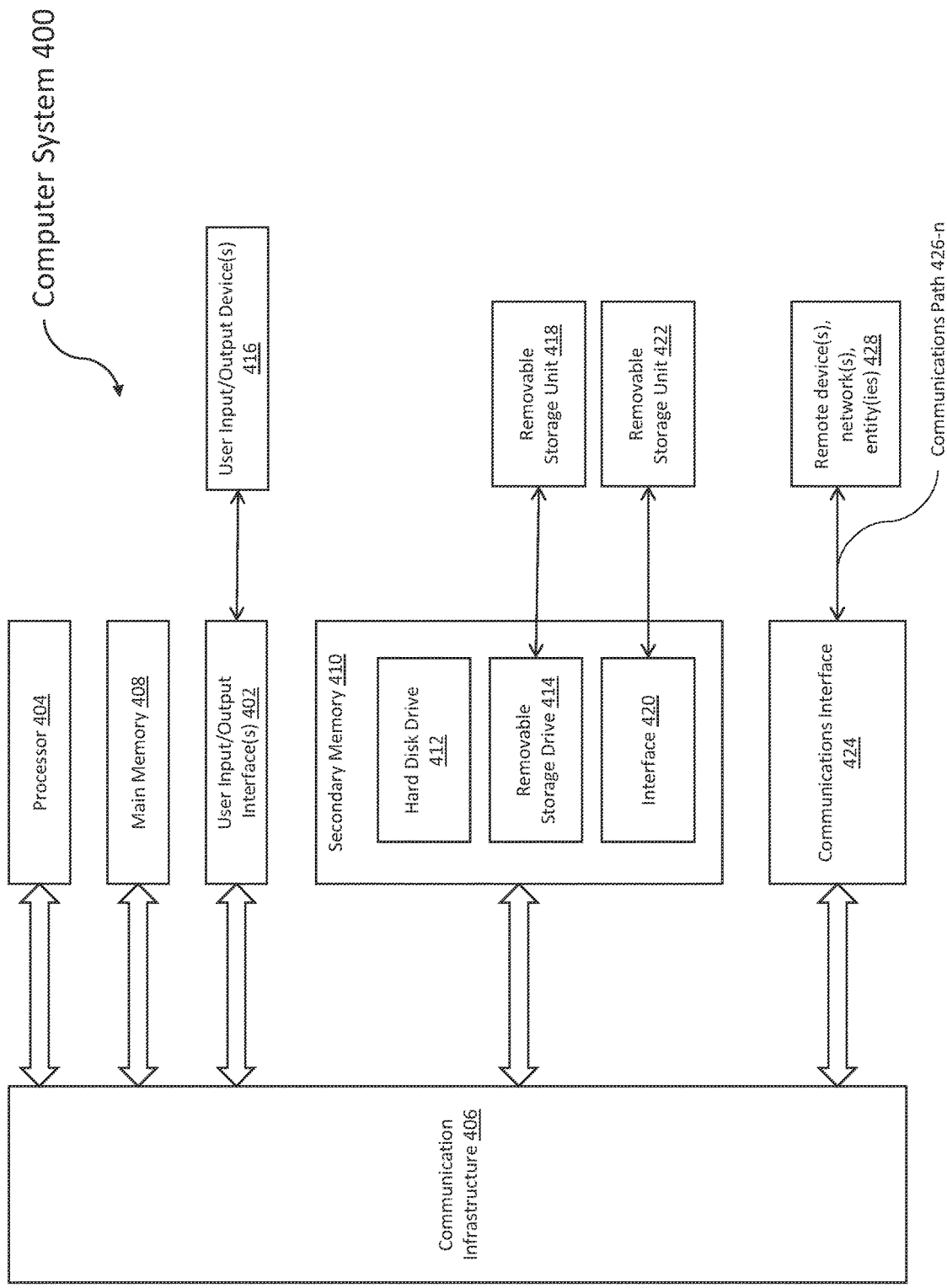
FIG. 4 is a block diagram of an example computer system for implementing various aspects of the present disclosure.

Various aspects can be implemented, for example, using one or more computer systems, such as computer system 400 shown in FIG. 4. Computer system 400 can be used, for example, to implement a system of facilitating the collection of compost from compost producers by compost collectors. For example, computer system 400 can facilitate the collection of compost from compost producers by compost collectors, Computer system 400 can be any computer capable of performing the functions described herein.

Computer system 400 can be any well-known computer capable of performing the functions described herein—such as the operations in method 200 of FIG. 2 and method 300 of FIG. 3.

Computer system 400 includes one or more processors (also called central processing units, or CPUs), such as a processor 404. Processor 404 is connected to a communication infrastructure or bus 406.

One or more processors 404 can each be a graphics processing unit (GPU). In an aspect, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 400 also includes user input/output device(s) 416, such as monitors, keyboards, pointing devices, etc., that communicate with communication infrastructure 406 through user input/output interface(s) 402.

Computer system 400 also includes a main or primary memory 408, such as random access memory (RAM). Main memory 408 can include one or more levels of cache. Main memory 408 has stored therein control logic (e.g., computer software) and/or data.

Computer system 400 can also include one or more secondary storage devices or memory 410. Secondary memory 410 can include, for example, a hard disk drive 412 and/or a removable storage device or drive 414. Removable storage drive 414 can be a floppy disk drive, a magnetic tape drive, a compact disk drive, an optical storage device, tape backup device, and/or any other storage device/drive.

Removable storage drive 414 can interact with a removable storage unit 418. Removable storage unit 418 includes a computer usable or readable storage device having stored thereon computer software (control logic) and/or data. Removable storage unit 418 can be a floppy disk, magnetic tape, compact disk, DVD, optical storage disk, and/any other computer data storage device. Removable storage drive 414 reads from and/or writes to removable storage unit 418 in a well-known manner.

According to an exemplary aspect, secondary memory 410 can include other means, instrumentalities or other approaches for allowing computer programs and/or other instructions and/or data to be accessed by computer system 400. Such means, instrumentalities or other approaches can include, for example, a removable storage unit 422 and an interface 420. Examples of the removable storage unit 422 and the interface 420 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 can further include a communication or network interface 424. Communication interface 424 enables computer system 400 to communicate and interact with any combination of remote devices, remote networks, remote entities, etc. (individually and collectively referenced by reference number 428). For example, communication interface 424 can allow computer system 400 to communicate with remote devices 428 over communications path 426, which can be wired and/or wireless, and which can include any combination of LANs, WANs, the Internet, etc. Control logic and/or data can be transmitted to and from computer system 400 via communication path 426.

In an aspect, a tangible, non-transitory apparatus or article of manufacture including a tangible, non-transitory computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings in this disclosure, it will be apparent to persons skilled in the relevant art(s) how to make and use aspects of this disclosure using data processing devices, computer systems and/or computer architectures other than that shown in FIG. 4. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A method for anonymizing a user during a media-based interaction, wherein the media-based interaction comprises video data and audio data, the method comprising:
   receiving the video data, wherein the video data comprises facial information of the user;
   receiving the audio data, wherein the audio data comprises speech data associated with the video data;
   accessing one or more identifiers, wherein each of the one or more identifiers is associated with one or more bias categories, the one or more identifiers comprising a mapping, wherein each of the one or more identifiers is mapped to a set of one or more synonyms that are neutral with respect to at least one of the one or more bias categories;
   applying a natural language filter to the audio data to generate altered speech of the user based on the one or more identifiers, wherein the natural language filter is configured to:
      detect a set of one or more words in the audio data;
      match a word in the set of one or more words with an identifier in the one or more identifiers; and
      replace, in the audio data, the word with a mapped synonym in the set of one or more synonyms;
   identifying one or more facial expressions from the facial information of the user;
   generating, based on the one or more facial expressions, a neutral facial representation of the user, wherein the neutral facial representation of the user anonymizes the user;
   generating a virtual representation of the user, wherein the virtual representation comprises:
      a visual component that includes the neutral facial representation of the user; and
      an audio component comprising the altered speech of the user; and
   transmitting, during the media-based interaction, the virtual representation to one or more computing devices over an electronic network.

2. The method of claim 1, wherein the one or more bias categories comprise age, race, and gender.

3. The method of claim 2, wherein each of the one or more synonyms has a confidence score corresponding to a meaning of the identifier and a meaning of each of the one or more synonyms.

4. The method of claim 1, further comprising applying a bias score to the audio data, wherein the bias score corresponds to a number of identifiers associated with one or more of the one or more bias categories identified in the audio data.

5. The method of claim 1, wherein the visual component of the visual representation is based on at least one of the one or more bias categories corresponding to the user.

6. The method of claim 1, applying the natural language filter further comprises replacing a frequency of the audio data with one or more neutral frequencies, wherein the one or more frequencies are different from a voice frequency associated with the user.

7. The method of claim 1, applying the natural language filter further comprises replacing a tempo of the audio data with one or more neutral tempos, wherein the one or more tempos are different from the tempo of the user's voice.

8. The method of claim 1, wherein the list of identifiers and their associated mappings include at least one customizable feature comprising adding an identifier to the list of identifiers.

9. A computing device for anonymizing a user during a media-based interaction, wherein the media-based interaction comprises video data and audio data, the computing device comprising:
   a processor, wherein the processor further comprises a processing unit; and
   a memory, wherein the memory contains instructions stored thereon that when executed by the processor cause the computing device to:
      receive the video data, wherein the video data comprises facial information of the user;
      receive the audio data, wherein the audio data comprises speech data associated with the video data;
      access one or more identifiers, wherein each of the one or more identifiers are associated with one or more bias categories, the one or more identifiers comprising a mapping, wherein each of the one or more identifiers is mapped to a set of one or more synonyms that are neutral with respect to at least one of the one or more bias categories;
      apply a natural language filter to the audio data to generate altered speech of the user based on the one or more identifiers, wherein the natural language filter is configured to:
         detect a set of one or more words in the audio data;
         match a word in the set of one or more words with an identifier in the one or more identifiers; and
         replace, in the audio data, the word with a mapped synonym in the set of one or more synonyms;
      identify one or more facial expressions from the facial information of the user;
      generate, based on the one or more facial expressions, a neutral facial representation of the user, wherein the neutral facial representation of the user anonymizes the user;
      generate a virtual representation of the user, wherein the virtual representation comprises:
         a visual component that includes the neutral facial visual representation of the user; and
         an audio component comprising the altered speech of the user; and
      transmit, during the media-based interaction, the virtual representation to one or more computing devices over an electronic network.

10. The computing device of claim 9, wherein the one or more bias categories comprise age, race, and gender.

11. The computing device of claim 10, wherein each of the one or more synonyms has a confidence score corresponding to a meaning of the identifier, a meaning of each of the one or more synonyms, and a meaning of a plurality of words surrounding the identifier.

12. The computing device of claim 9, wherein the memory contains further instructions stored thereon that when executed by the processor cause the computing device to:
   apply a bias score to the audio data, wherein the bias score corresponds to a number of identifiers associated with one or more of the one or more bias categories identified in the audio data.

13. The computing device of claim 9, wherein the visual component of the visual representation is based on at least one of the one or more bias categories corresponding to the user.

14. The computing device of claim 9, wherein the natural language filter further comprises replacing a frequency of the audio data with one or more neutral frequencies, wherein the one or more frequencies are different from a voice frequency associated with the user.

15. The computing device of claim 9, wherein the natural language filter further comprises replacing a tempo of the audio data with one or more neutral tempos, wherein the one or more tempos do not match the tempo of the user's voice.

16. The computing device of claim 9, wherein the list of identifiers and their associated mappings include at least one customizable feature comprising adding an identifier to the list of identifiers.

17. A non-transitory computer-readable medium having instructions stored thereon that, when executed by at least one computing device, cause the at least one computing device to perform operations for anonymizing interaction during a media-based interaction, wherein the media-based interaction comprises video data and audio data, the operations comprising:
- receiving the video data, wherein the video data comprises facial information of the user;
- receiving the audio data, wherein the audio data comprises speech data associated with the video data;
- accessing one or more identifiers, wherein each of the one or more identifiers are associated with at least one or more bias categories, the one or more identifiers comprising a mapping, wherein each of the one or more identifiers is mapped to a set of one or more synonyms that are neutral with respect to the at least one of the one or more bias categories;
- applying a natural language filter to the audio data to generate altered speech of the user based on the one or more identifiers, wherein the natural language filter is configured to:
  - detect a set of one or more words in the audio data;
  - match a word in the set of one or more words with an identifier in the one or more identifiers; and
  - replace, in the audio data, the word with a mapped synonym in the set of one or more synonyms;
- identifying one or more facial expressions from the facial information of the user;
- generating, based on the one or more facial expressions, a neutral facial representation of the user, wherein the neutral facial representation of the user anonymizes the user;
- generating a virtual representation of the user, wherein the virtual representation comprises:
  - a visual component that includes the neutral facial representation of the user; and
  - an audio component comprising the altered speech of the user; and
- transmitting, during the media-based interaction, the virtual representation to one or more computing devices over an electronic network.

18. The non-transitory computer-readable medium of claim 17, wherein the one or more bias categories comprise age, race, and gender.

19. The non-transitory computer-readable medium of claim 18, wherein each of the one or more synonyms has a confidence score corresponding to a meaning of the identifier, a meaning of each of the one or more synonyms, and a meaning of a plurality of words surrounding the identifier.

20. The non-transitory computer-readable medium of claim 17, further comprising applying a bias score to the audio data, wherein the bias score corresponds to a number of identifiers associated with one or more of the one or more bias categories identified in the audio data.

* * * * *